United States Patent [19]

Keller et al.

[11] Patent Number: 4,696,708

[45] Date of Patent: Sep. 29, 1987

[54] ULTRASONIC WELDING

[75] Inventors: Joseph R. Keller; Bruce C. Longenecker, both of Harrisburg, Pa.

[73] Assignee: AMP Incorporated, Harrisburg, Pa.

[21] Appl. No.: 797,583

[22] Filed: Nov. 13, 1985

[51] Int. Cl.⁴ .................... B29C 65/08; G01N 29/00
[52] U.S. Cl. ........................................ 156/64; 73/582;
73/588; 156/73.1; 156/366; 156/378;
156/580.1; 228/1.1; 228/103; 228/110
[58] Field of Search ............... 156/73.1, 73.2, 580.1,
156/580.2, 64, 366, 378; 228/1.1, 103, 110;
73/588, 582

[56] References Cited

U.S. PATENT DOCUMENTS

| | | | |
|---|---|---|---|
| 3,056,192 | 10/1962 | Jones | 228/110 |
| 3,573,781 | 4/1971 | Shoh | 228/1.1 |
| 3,965,726 | 6/1976 | Vahaviolos | 73/588 |
| 4,004,456 | 1/1977 | Vahaviolos | 73/588 |
| 4,007,631 | 2/1977 | Saifi et al. | 73/588 |
| 4,024,522 | 5/1977 | Clark et al. | 228/1.1 |
| 4,373,653 | 2/1983 | Salzer et al. | 156/580.1 |

*Primary Examiner*—Michael Wityshyn
*Attorney, Agent, or Firm*—Thomas G. Terrell

[57] ABSTRACT

The ultrasonic energy applied to a workpiece to be welded in an ultrasonic welding operation, over a predetermined welding time, is measured by processing the output of a load cell beneath the workpiece to produce a signal voltage for comparison with a predetermined reference voltage corresponding to the accumulated ultrasonic energy that should have been applied to the workpiece during said predetermined time to satisfactorily weld the workpiece. A one-shot timer is started at the commencement of the welding operation. If the comparison reveals that signal voltage has reached the reference voltage before the timer has run out, a success signal is generated to indicate the completion of the welding operation.

13 Claims, 3 Drawing Figures

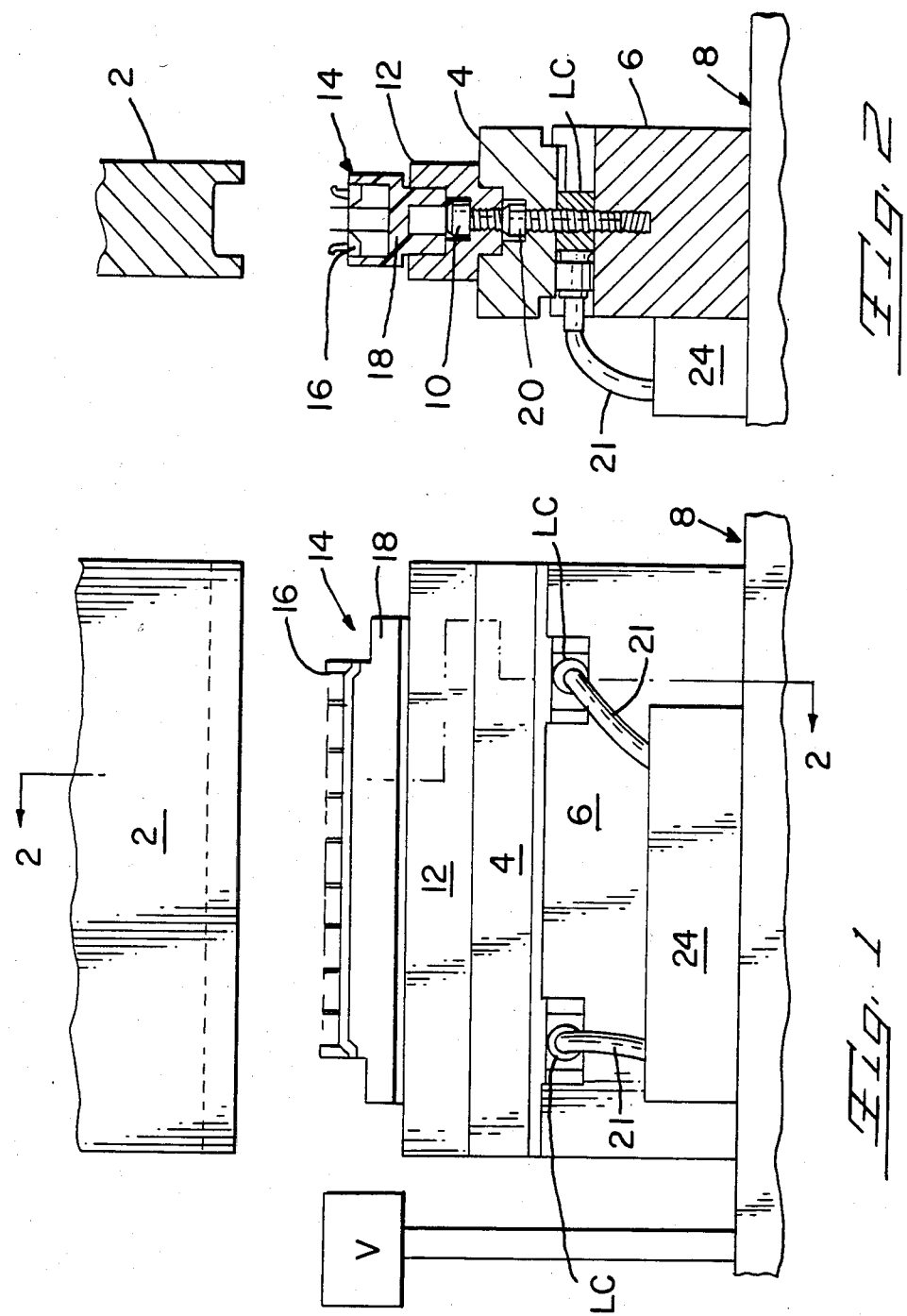

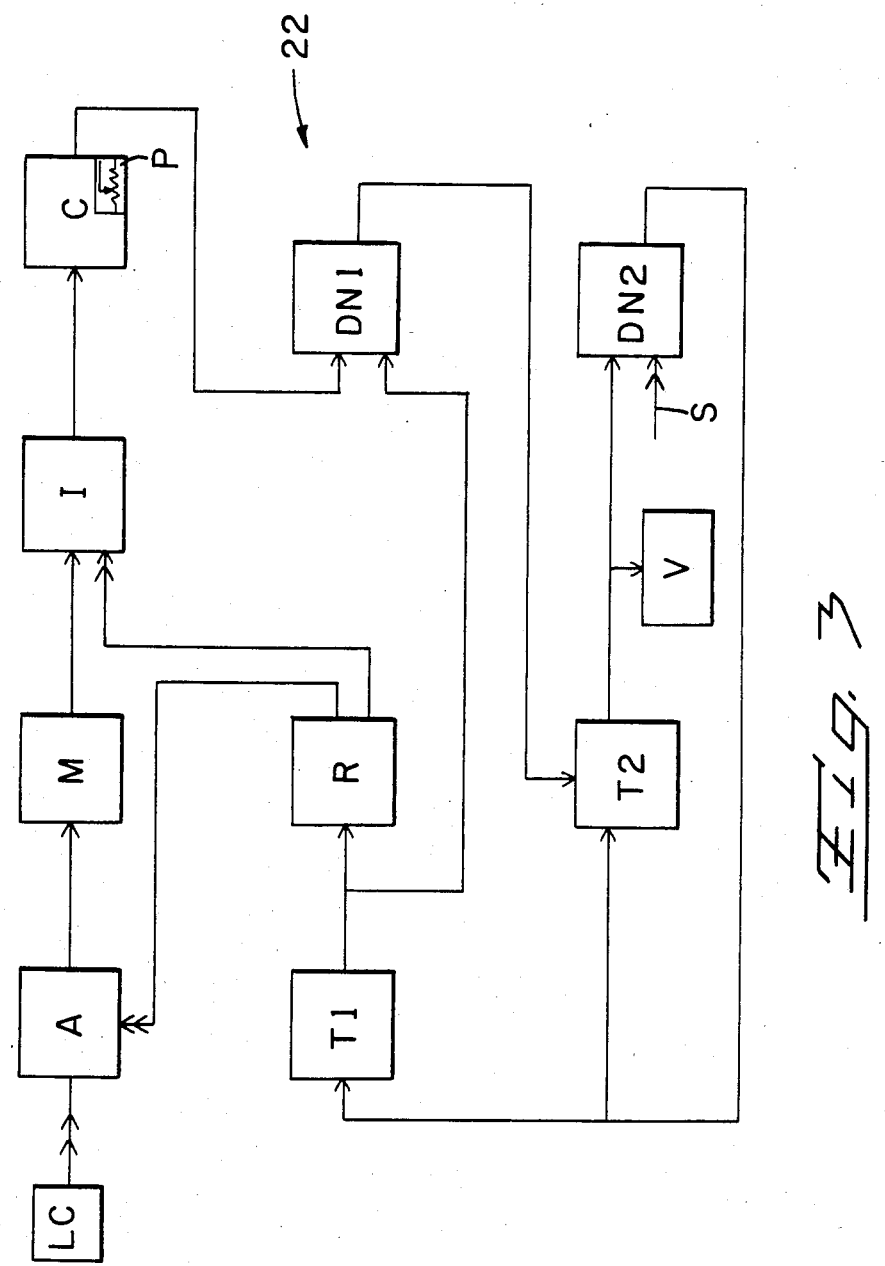

ULTRASONIC WELDING

This invention relates to ultrasonic welding and in particular to a method of measuring the relative ultrasonic energy coupled to a load cell through a workpiece to be welded in an ultrasonic welding operation, to apparatus for that purpose, and to an ultrasonic welding machine.

In order to achieve a satisfactory weld in an ultrasonic welding operation, a predetermined amount of ultrasonic energy must be applied to the workpiece to be welded within a given time, criteria which can be determined by experiment. However, in carrying out an ultrasonic welding operation, it may be difficult to determine whether or not a satisfactory weld has been achieved as the ultrasonic coupling coefficient and the output amplitude of the welding machine may vary and so cannot be accurately be predetermined for each workpiece.

The invention proceeds from the realization, that it can be ensured that an ultrasonic welding operation has been satisfactorily carried out by measuring the ultrasonic energy coupled through the workpiece to a load cell, suitably processing the output of the load cell, comparing the signal so produced, with a selected reference value, and if the signal reaches the reference value within a predetermined time, causing a success signal to be emitted, to inidcate that the welding operation has successfully been performed. Said reference value and said predetermined time should be adjusted in accordance with the workpiece and the welding conditions, such adjustment being determined by an appropriate test program.

The load cell output may be processed by means of a multiplier for producing a sinusoidal voltage which is instantaneously proportional to the ultrasonic energy applied to the workpiece and summing said voltage over time so as to be proportional to the accumulated ultrasonic energy applied to the workpiece, after which the signal so produced is compared with the reference value, and if it reaches such value within a period of time determined by a suitable timing device, the success signal is caused to be emitted. The success signal may be employed to actuate visual indicating means and/or to actuate means for turning off the ultrasonic horn and initiating a further cycle of operation of the welding machine. The success signal may for example be used to enable the machine to carry out a further cycle of operation, the success signal being supplies to the welding machine controller, and/or to the controller of a mother machine, of which the welding machine is part. In the event said predetermined value is not reached within said predetermined time, a visual or audible failure signal may be generated, and/or the machine may be inhibited from performing a further cycle of operation.

In the case of malformation of the workpiece, for example where bubbles have been allowed to form in the material to be welded, the correct ultrasonic dosage may not be achieved within said predetermined time, so that the invention is also relevant to the detection of faults in workpiece production, which cannot be detected by eye.

In order to couple the load cell to the ultrasonic energy emitted by the horn of the welding machine, the load cell is supported in prestressed condition beneath the work-holder of the machine. Where the workpiece is long, a plurality of load cells may be arranged beneath the workpiece so as to produce an output which is proportional to the average value of the ultrasonic energy coupled through the workpiece to the load cells.

A comparator for comparing the processed load cell output may be connected to a first gate which can be opened by a provisional success signal from the comparator indicating that the predetermined reference value has been reached, and by a signal emitted by a timing device arranged to run for a predetermined period of time following the initiation of the welding operation, so that the first gate emits a final success signal to open a normally closed second gate to allow the timing device to be restarted.

For a better understanding of the invention and to show how it may be carried into effect, reference will now be made by way of example to the accompanying drawings in which:

FIG. 1 is an elevation, with part omitted, of an ultrasonic welding machine incorporating means for measuring the ultrasonic energy applied to a workpiece being ultrasonically welded bymeans of the machine;

FIG. 2 is a view taken on the lines 2—2 of FIG. 1; and

FIG. 3 is a block schematic diagram of an ultrasonic energy measuring circuit of the machine.

As shown in FIGS. 1 and 2, the welding machine comprises an ultrasonic welder horn 2 (only part of which is shown) beneath which is a tooling base 4 mounted on a fixture base 6 which is int urn mounted on a machine base 8. A work holder 12 is rigidly, but exchangeably mounted on the base 4 by means of screws 10 (only one of which is shown). A workpiece 14, in the form of an electrical connector assembly comprising synthetic plastics parts 16 and 18, which are to be ultrasonically welded together, is supported by the work holder 12 to receive ultrasonic energy from the horn 2. Load cells LC in the form of transducers, are mechanically loaded between the bases 4 and 6, the base 4 constituting a beam common to the cells LC, by means of screws 20 (only one of which is shown) threaded therethrough, the load cells LC being positioned relative to the workpiece 14 to receive ultrasonic energy coupled thereto through the workpiece 14. The load cells LC are connected in parallel via electrical leads 21, to an ultrasonic energy measuring circuit 22 (FIG. 3) in a housing 24 on the base 8.

The cells LC and the circuit 22 constitute means for measuring the relative ultrasonic energy coupled through the workpiece 14 to the cells LC to control the quality of the welding work. As described below and as briefly stated, here, the load cell output voltage is processed, and is compared to a predetermined reference value and if the reference value is reached within a given period of time, a success signal is emitted to indicate that the welding operation has successfully been carried out and to enable restarting of the welding machine. If said reference value is not reached within said time period, further operation of the welding machine is disabled.

The output signal of each load cell LC is proportional to the amplitude of the ultrasonic energy to which the load cell is coupled through the workpiece 14 and continues so long as the horn 2 continues to transmit. The output voltages of the transducers are collectively proportional to the average of the ultrasonic energy applied to the workpiece 14.

As shown in FIG. 3, outlets of the cells LC are connected in parallel to a Kistler charge voltage amplifier A which amplifies the output voltages of the cells LC. The outlet of the amplifier A is in turn connected to a multiplier M which squares the voltage input applied thereto by the amplifier A to render it instantaneously proportional to the ultrasonic energy coupled to the load cells LC through the workpiece 14. The output voltage signal of the multiplier M is applied to an inlet of an integrator I which, can be switched, as described below, from an inactive to an active state and vice versa. When the integrator I is active, it sums up the output voltage of the multiplier M over time, to produce a sinusoidal voltage output which is proportional to the work done, that is to say to the accumulated ultrasonic energy that has been applied to the workpiece. The outlet of the integrator I is connected to a comparator C which compares the output thereof with a reference value. In the form of a reference voltage level corresponding to the work which ought to have been done in order to produce a satisfactory weld. This reference voltage level can be set by means of a potentiometer P in the comparator C, to a predetermined value based upon previous welding tests with the workpiece concerned.

If the output of the integrator reaches the reference voltage level, the comparator C emits a provisional success signal indicative of that fact.

The outlet of the comparator C is connected to one inlet of a first dual NAND gate DN1 to the other inlet which is connected to the outlet of a one shot timer T1 which outlet is also connected to a normally closed, double pole, double throw relay R, which, when opened, removes short circuits from the amplifier A and the integrator I so as to activate them. When the relay R is closed the amplifier A and integrator I are both inactive.

One inlet S of a second dual NAND gate DN2 is connected to the welding machine to receive therefrom a start signal, of high value, upon the initiation of a welding operation. The other inlet of the gate DN2 is connected to the outlet of a latch timer T2 having a first inlet connected to the outlet of the gate DN1 and a second inlet connected to the outlet of the gate DN2, and which is also connected to the inlets of both of the timers T1 and T2.

When the timer T2 is not running, it transmits a high value signal to the gate DN2. Thus, when the start signal, which is also of high value as mentioned above, is applied to the inlet S of the gate DN2, the outlet thereof is energized thereby starting both of the timers T1 and T2. The timer T1 therefore opens the relay R so as to activate the amplifier A and the integrator I, and the timer T2 emits a low value output signal so that the gate DN2 is blocked and does not therefore energize its outlet. The timer T1 is arranged to run, following the application of the start signal, for a predetermined welding period of time, which has been set in accordance with the welding tests mentioned above. Whilst the timer T1 is running, its outlet is energized to apply a high value output signal to said other inlet of the gate DN1. Thus if the high value provisional success signal emitted by the comparator C coincides with the runnig of the timer T1, the gate DN1 is opened so as to turn off the timer T2, which thereby transmits a high value final success signal to the gate DN2 thus resetting the circuit 22 to monitor the next following operation. The final success signal is arranged to turn off the welding horn and optionally, also to actuate a visual display V to indicate that the welding machine has completed its cycle of operation.

If, however, the timer T1 has stopped, i.e. time has run out, before the provisional success signal has been emitted by the comparator C, the gate DN1 remains closed so that the timer T2 continues to run maintaining the gate DN2 it is closed state so that any further start signal applied to the inlet S will neither turn on the timer T1 nor turn off the timer T2. The low value signal emitted by the timer T1 in such case is arranged to maintain the welding horn in a turned off condition and, optionally, also to actuate the display V to indicate that the welding operation has been unsuccessful. The low value signal emitted by the timer T1 could otherwise, for example, be employed to actuate an unsuccessful weld counter arranged to disenable further welding operations upon a predetermined count of unsuccessful welds being reached.

We claim:

1. A method of measuring the relative ultrasonic energy coupled to a load cell through a workpiece to be welded in an ultrasonic welding operation, the method comprising the steps of:

placing said workpiece in a work holder, said workholder being disposed beneath, and being spaced from, an ultrasonic welding horn, with said load cell supported beneath said workholder in a mechanically preloaded condition so that said load cell produces an output signal proportional to the amplitude of the ultrasonic energy to which the load cell is couple through the workpiece;

starting, upon the initiation of the welding operation, a timer arranged to run for a predetermined welding period of time;

processing the output signal of the load cell to produce a sinusoidal voltage which is instantaneously proportional to the ultrasonic energy coupled through the workpiece to the load cell;

summing said voltage over time so as to be proportional to the accumulated ultrasonic energy applied to the workpiece;

generating a reference voltage of a value corresponding to the accumulated ultrasonic energy that should have been applied to the workpiece during said predetermined period of time in order satisfactorily to weld the workpiece;

comparing said summed voltage with said reference voltage; and generating a success signal if the value of said summed voltage reaches the value of said reference voltage whilst said timer is running.

2. A method as claimed in claim 1, comprising the further step of applying said success signal to means for indicating that said workpiece has been satisfactorily welded.

3. A method as claimed in claim 1, further comprising the step of inhibiting the application of a further start signal to said timer, if said reference voltage value exceeds that of said summed voltage.

4. A method as claimed in claim 1, further comprising the step of inhibiting the application of a further start signal to said timer if said timer has stopped before the value of said summed voltage reaches that of said reference voltage.

5. Apparatus for measuring the relative ultrasonic energy applied through an ultrasonic welding horn to a workpiece to be welded in an ultrasonic welding operation, the apparatus comprising:

a workholder beneath said horn, for supporting said workpiece;

a load cell supported in a preloaded condition beneath said workholder, for producing an output proportional to the amplitude of said ultrasonic energy emitted by said horn and coupled through the workpiece to the load cell;

a one-shot timer responsive to a start signal to run for a predetermined welding period of time;

a multiplier connected to the load cell for producing a sinusoidal voltage instantaneously proportional to the amplitude of said ultrasonic energy coupled through the workpiece to the load cell;

an integrator connected to the multiplier for summing said voltage over time to produce an output voltage which is proportional to the accumulated energy applied to the workpiece;

comparator means connected to said integrator for generating a reference voltage of a value corresponding to a predetermined accumulated reference amount of said ultrasonic energy, for comparing the output voltage of said multiplier with said reference voltage, and for emitting a provisional success signal if said reference voltage does not exceed said output voltage; and gate means connected to said comparator means and to said timer, for emitting a final success signal in response to said provisional success signal, when said timer is running.

6. Apparatus as claimed in claim 5, further comprising a latch timer connected to said gate means and to said one-shot timer and being arranged to be started in response to said start signal to inhibit the application of a further start signal to said one-shot timer and being arranged to be stopped in response to said final success signal to permit said further start signal to be applied to said one-shot timer.

7. Apparatus as claimed in claim 5, further comprising a relay connected to said one-shot timer and to said integrator, to inhibit the operation of said integration when said one-shot timer is stopped.

8. Apparatus as claimed in claim 5, comprising a Kistler charge amplifier connected to said load cell and to said multiplier to amplify the output voltage of said load cell.

9. An ultrasonic welding machine, comprising:
an ultrasonic welding horn;
a workholder beneath the horn and supporting a workpiece to be welded, said workholder being disposed in spaced relationship with the horn to position said workpiece to receive ultrasonic energy from the horn;
a transducer supported in a preloaded condition beneath the workholder and being coupled through said workpiece to ultrasonic energy emitted by said horn; and
an ultrasonic measuring circuit connected to the transducer for measuring the relative ultrasonic energy coupled thereto through the workpiece, for measuring the accumulated ultrasonic energy so measured, for comparing said accumulated ultrasonic energy with a reference value, and for producing a final success signal if said accumulated energy reaches said reference value during a predetermined welding period of time.

10. Apparatus as claimed in claim 9, wherein said circuit comprises a one-shot timer responsive to a start signal for actuating the welding horn, so as to run for a predetermined welding period of time:
a multiplier connected to the transducer for producing a sinusoidal voltage instantaneously proportional to the amplitude of said ultrasonic energy applied to the workpiece;
an integrator connected to the multiplier for summing said voltage over time to produce an output voltage which is proportional to the accumulated energy applied to the workpiece;
a comparator connected to said integrator for generating a reference voltage of a value corresponding to a predetermined reference amount of said accumulated ultrasonic energy and having means for comparing the output voltage of said multiplier with said reference voltage and for emitting a provisional success signal if the value of said output voltage reaches that of said reference voltage; and
gate means connected to said comparator and to said timer for emitting said final success signal in response to said provisional success signal when said timer is running.

11. Apparatus as claimed in claim 10, wherein a latch timer is connected to said gate means and to said one shot timer and is actuable by said start signal to inhibit the application of a further start signal to said one-shot timer, said latch timer being actuable by said final success signal to permit said further start signal to be applied to said one-shot timer.

12. Apparatus as claimed in claim 11, further comprising a relay connected to said one-shot timer and to said integrator to inhibit the operation thereof when said one-shot timer is stopped.

13. An ultrasonic welding machine, comprising:
an ultrasonic welding horn;
a workholder beneath the horn disposed in spaced relationship with respect to the horn, and the workholder comprising an elongate workpiece to be weled, to receive ultrasonic energy from the horn;
a tooling base supporting the workholde;r
a fixture base beneath the tooling base;
first and second transducers supported between said bases in a mechanically preloaded condition and being spaced frome ach other lengthwise of the workpiece; the tooling base constituting a beam common to said transducers, the transducers being positioned below the workpiece to receive ultrasonic energy coupled through the workpiece to said trandsucers;
an ultrasonic measuring circuit to which the transducers are connected in parallel to produce an output which is proportional to the average value of the energy coupled through the workpiece to said transducers for measuring the relative ultrasonic energy coupled thereto through the workpiece, for measuring the accumulated ultrasonic energy so measured, for comparing said accumulated ultrasonic energy with a reference value, and for producing a final success signal if said accumulated energy reaches said reference value during a predetermined welding period of time.

* * * * *

UNITED STATES PATENT OFFICE
CERTIFICATE OF CORRECTION

Patent No. 4,696,708          Dated Sept. 29, 1987

Inventor(s) Joseph Richard Keller et al.

It is certified that error appears in the above-identified patent and that said Letters Patent are hereby corrected as shown below:

Claim 13, column 6, line 40, delete "comprising" and insert --- supporting---.

Claim 13, column 6, line 47, delete "ach" and insert --- each ---.

Signed and Sealed this

Twenty-sixth Day of January, 1988

Attest:

DONALD J. QUIGG

*Attesting Officer*      *Commissioner of Patents and Trademarks*